United States Patent
Song et al.

(10) Patent No.: US 11,923,542 B2
(45) Date of Patent: Mar. 5, 2024

(54) POSITIVE ACTIVE MATERIAL FOR LITHIUM RECHARGEABLE BATTERY, MANUFACTURING METHOD THEREOF, AND LITHIUM RECHARGEABLE BATTERY INCLUDING SAME POSITIVE ACTIVE MATERIAL

(71) Applicant: RESEARCH INSTITUTE OF INDUSTRIAL SCIENCE & TECHNOLOGY, Pohang-si (KR)

(72) Inventors: Jung Hoon Song, Seoul (KR); Geun Hwangbo, Incheon (KR); Sang Cheol Nam, Seoul (KR); Sang Hyuk Lee, Incheon (KR); Do Hyeong Kim, Pohang-si (KR); Hye Won Park, Changwon-si (KR)

(73) Assignee: RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 285 days.

(21) Appl. No.: 16/767,699

(22) PCT Filed: Nov. 20, 2018

(86) PCT No.: PCT/KR2018/014278
§ 371 (c)(1),
(2) Date: May 28, 2020

(87) PCT Pub. No.: WO2019/124767
PCT Pub. Date: Jun. 27, 2019

(65) Prior Publication Data
US 2021/0184213 A1    Jun. 17, 2021

(30) Foreign Application Priority Data
Dec. 21, 2017    (KR) .................. 10-2017-0177562

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/44* (2013.01); *H01M 4/505* (2013.01); *H01M 10/0525* (2013.01); *H01M 2004/028* (2013.01)

(58) Field of Classification Search
None
See application file for complete search history.

(56) References Cited

FOREIGN PATENT DOCUMENTS

| CN | 101009369 | 8/2007 |
| CN | 102239588 | 11/2011 |

(Continued)

OTHER PUBLICATIONS

J. Li, H. Li, W. Stone, R. Weber, S. Hy, J. R. Dahn. Synthesis of Single Crystal LiNi0.5Mn0.3Co0.2O2 for Lithium Ion Batteries, Journal of the Electrochemical Society, 164 (14) A3529-A3537 (2017).*

(Continued)

*Primary Examiner* — Carlos Barcena
(74) *Attorney, Agent, or Firm* — LEX IP MEISTER, PLLC

(57) ABSTRACT

The present disclosure relates to a positive active material for a lithium rechargeable battery, a manufacturing method thereof, and a lithium rechargeable battery including the positive active material, and it provides a positive active material which is a lithium composite metal oxide including nickel, cobalt, and manganese, and either has orientation in a direction of with respect to an ND axis that is equal to or greater than 29% or has orientation in a direction of [120]+ [210] with respect to an RD axis that is equal to or greater (Continued)

ND-Direction IPF MAP than 82% in the case of an EBSD analysis with a misorientation angle (Δg) that is equal to or less than 30 degrees.

7 Claims, 2 Drawing Sheets

(51) Int. Cl.
    *H01M 4/505*      (2010.01)
    *H01M 10/0525*    (2010.01)
    *H01M 4/02*       (2006.01)

(56) References Cited

FOREIGN PATENT DOCUMENTS

| | | |
|---|---|---|
| CN | 106920934 | 7/2017 |
| CN | 107093740 | 8/2017 |
| CN | 10733858 | 11/2017 |
| CN | 107408667 | 11/2017 |
| JP | 2005-005105 | 1/2005 |
| JP | 2012-004097 | 1/2012 |
| JP | 2014-506220 | 3/2014 |
| JP | 2015-506075 | 2/2015 |
| JP | 2015-115105 | 6/2015 |
| JP | 2016-222483 | 12/2016 |
| JP | 2017-117529 | 6/2017 |
| KR | 10-2004-0106207 | 12/2004 |
| KR | 10-2009-0082790 | 7/2009 |
| KR | 10-1375704 | 3/2014 |
| KR | 10-1440241 | 9/2014 |
| KR | 10-1605969 | 3/2016 |
| KR | 10-2017-0076164 | 7/2017 |
| WO | 2012-137391 | 10/2012 |
| WO | 2012-137534 | 10/2012 |
| WO | 2017-150945 | 9/2017 |
| WO | 2018-020845 | 2/2018 |
| WO | 2018-021555 | 2/2018 |

OTHER PUBLICATIONS

Jae-Hyun Shim et al., "Effects of heat-treatment atmosphere on electrochemical performances of Ni-rich mixed-metal oxide (LiNi0.80Co0.15Mn0.05O2) as a cathode material for lithium ion battery", Electrochimica Acta. Issue 138, p. 15-21 (Jun. 19, 2014).

Kipo, A Copy of PCT Search Report & Written Opinion of PCT/KR2018/014278 dated Feb. 27, 2019.

JPO, Office Action of JP 2020-534332 dated Oct. 26, 2021.

Shim, Jae-Hyun, et al. "Effects of heat-treatment atmosphere on electrochemical performances of Ni-rich mixed-metal oxide (LiNi0. 80Co0. 15Mn0. 05O2) as a cathode material for lithium ion battery." Electrochimica Acta 138 (Jun. 19, 2014): 15-21.

\* cited by examiner

ND-Direction IPF MAP

POSITIVE ACTIVE MATERIAL FOR LITHIUM RECHARGEABLE BATTERY, MANUFACTURING METHOD THEREOF, AND LITHIUM RECHARGEABLE BATTERY INCLUDING SAME POSITIVE ACTIVE MATERIAL

CROSS-REFERENCE TO RELATED APPLICATION

This application claims priority to and the benefit of Korean Patent Application No. 10-2017-0177562 filed in the Korean Intellectual Property Office on Dec. 21, 2017, the entire contents of which are incorporated herein by reference.

BACKGROUND OF THE INVENTION

(a) Field of the Invention

The present disclosure relates to a positive active material for a lithium rechargeable battery, a manufacturing method thereof, and a lithium rechargeable battery including the positive active material.

(b) Description of the Related Art

A positive active material that is one of elements configuring a lithium rechargeable battery directly serves in realization of energy density of the battery, and also becomes a factor in determining a life-span characteristic. In relation to this, researches on ternary positive active materials bases on nickel, cobalt, and manganese have recently been in active progress, and are mainly used to manufacture a positive electrode precursor using a co-precipitation method. The manufacturing of a ternary positive electrode precursor using a co-precipitation method signifies a method for injecting nickel sulfate, cobalt sulfate, and cobalt manganese in a 1-3M concentration into a reactor, and performing co-precipitation by using an ammonia solution as a complexing agent and caustic soda as a precipitator. The above information disclosed in this Background section is only for enhancement of understanding of the background of the invention, and therefore it may contain information that does not form the prior art that is already known in this country to a person of ordinary skill in the art.

SUMMARY OF THE INVENTION

Providing orientation to a precursor for a ternary positive electrode material used in the lithium rechargeable battery is generally known to mostly produce excellent electrochemical characteristics such as capacity, rate control, or cycle lifespan compared to a positive electrode material with no orientation, as a c-axis direction is perpendicularly arranged with respect to a direction in which lithium is intercalated or de-intercalated.

However, the precursor to which orientation is provided is known to be realized only when a concentration gradient is given to the precursor, and the concentration of metal ions in an inflow tank must change in order to realize this, so only batch-based process driving is allowable.

Further, to realize the batch process, a plurality of influent tanks for configuring a core and a shell are needed. Therefore, the method for assigning orientation in prior art has a drawback of high processing costs, compared to the general precursor manufacturing process.

The present invention realizes the orientation that is realizable in the conventional batch reactor in a flow reactor to thereby implement a skill for manufacturing a positive electrode precursor with orientation when there is no concentration gradient.

The discovery that a positive electrode material with orientation is possible through a concentration gradient represents an approach based on realizing experience-based orientation.

The present inventor analyzed the effect of the concentration gradient on formation of the precursor to deduce an effect for providing orientation of the precursor when there is no concentration gradient.

While the conventional general method for assigning orientation represents a method for forming a precursor by changing a concentration of metal ions that are input when a co-precipitation precursor is manufactured, the present invention relates to a method for assigning orientation not by changing the concentration of metal ions but by changing a process variable.

When the orientation is assigned by changing the process variable, a batch-type process used for assigning orientation in conventional art may be changed to a flow process, thereby generating an advantage of substantially reducing production cost of the precursor. In addition, in the case of applying it to the batch process, the manufacturing cost is reduced and no precise composition control is needed by reducing at least two types of inflow tanks for controlling the concentration of metal ions that are an influent to one type, so time control and pump control for manufacturing an oriented precursor may be simplified.

The present invention proposes a skill for manufacturing a positive electrode precursor with orientation when there is no concentration gradient by allowing orientation realizable by a conventional batch reactor to be realized by a flow reactor.

DETAILED DESCRIPTION OF THE EMBODIMENTS

Figure 1:
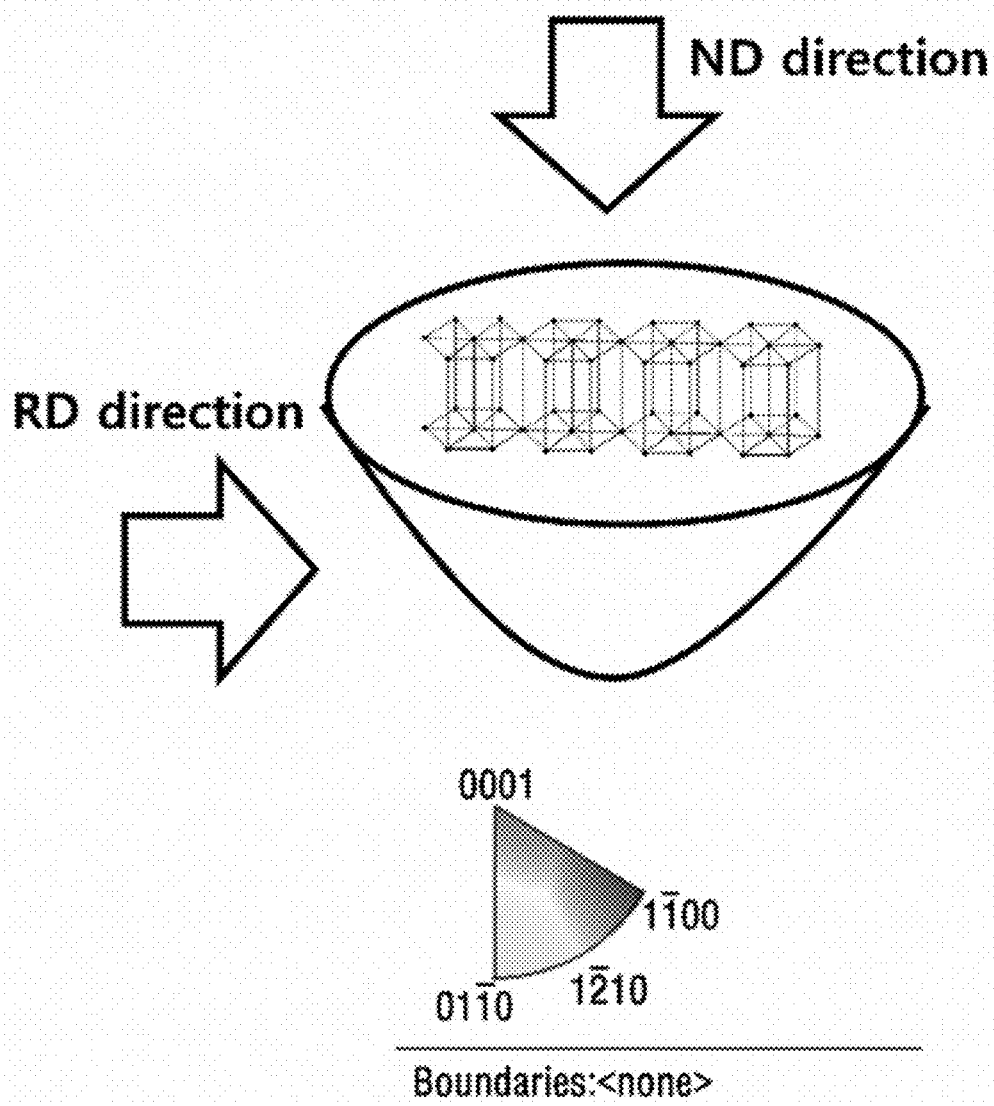
FIG. 1 represents a hemisphere particle cut in half through Focused Ion Beam (FIB) milling of one positive active material particle to measure the EBSD image.
Figure 2:
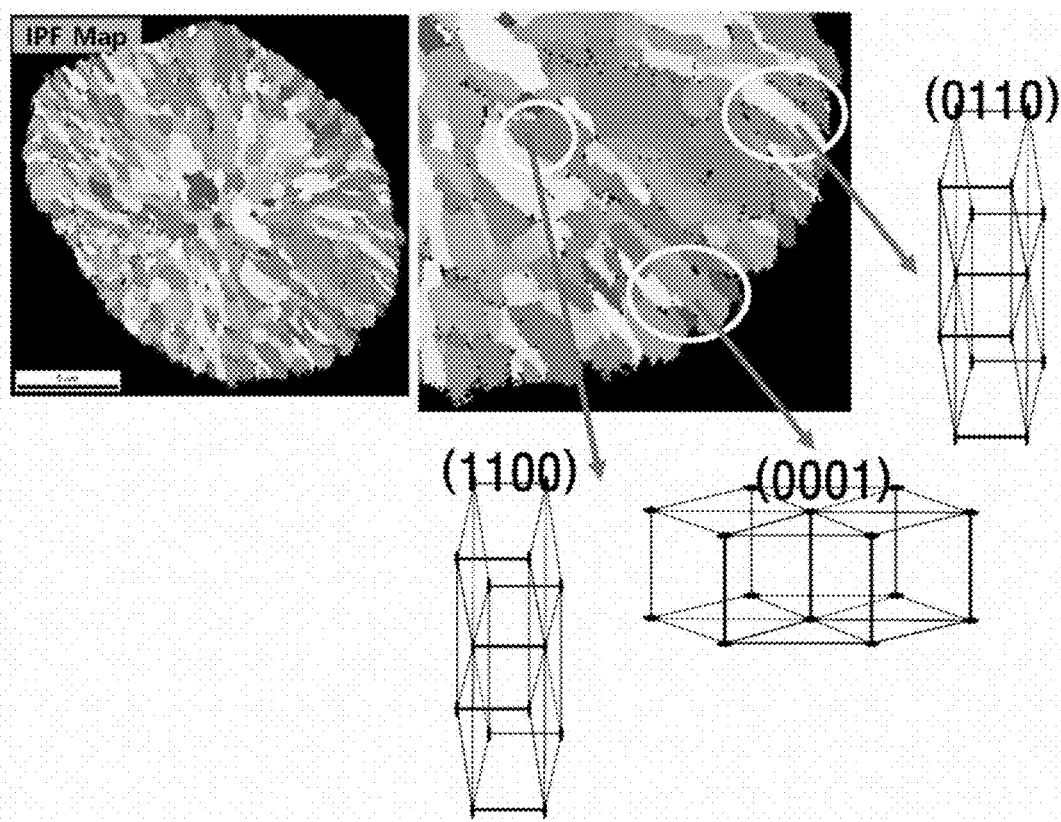
FIG. 2 shows an EBSD image taken as viewed from the ND axis direction, and is a conceptual diagram showing the process of specifying the (001) plane, (110) plane, and (100) plane in the EBSD image.

Exemplary embodiments of the present invention will now be described in detail. However, these are presented as examples, and the present invention is not limited thereto and is only defined by the scope of the claims to be described later.

In general, to manufacture an oriented positive electrode precursor, a precursor is generated by using a core solution mainly forming an internal composition and a shell solution mainly forming an external composition.

In detail, the concentration of metal ions is changed by partly generating an internal portion of the precursor with the core solution and inputting the shell solution to the core solution, and an external portion of the precursor is generated by inputting a metal ion solution in the changed concentration to a reactor.

In this instance, a concentration gradient is formed from the interior of the precursor toward the exterior thereof, showing a characteristic of orientation. Conventional art used a process for realizing a concentration gradient in the precursor so as to impart orientation to the precursor. For this reason, it had a drawback of only applying a batch-type reaction when attempting to realize the positive electrode material with orientation. The present invention proposes a method for manufacturing an oriented positive electrode material by changing not a concentration gradient but a processing condition.

Regarding a basic idea on the present invention, a principle of an orientation realizing mechanism includes: simplifying a dissolution phenomenon of ions in a solution based on nickel, manganese, and cobalt and not the concentration gradient with a concept of supersaturation, applying the same to an actual process, and acquiring an oriented positive electrode material.

In general, when a co-precipitation area with no complexing agent is calculated in the case of manganese, cobalt, and nickel ions used in the ternary positive electrode material, precipitation occurs at pH 7.5 in the case of manganese ions, at pH 9.2 in the case of cobalt ions, and at equal to or greater than pH 9.6 in the case of nickel ions.

However, in the presence of ammonia, which occurs in the actual co-precipitation condition, precipitation happens in a pH range that is much higher than the above-proposed value of pH in the case of nickel or cobalt that may be combined with ammonia. This is because the nickel and cobalt ions that may configure a complex with ammonia have a very high formation constant for indicating stability of the complex.

A complex compound combined with ammonia becomes very high, compared to the co-precipitation range when there is no ammonia.

In addition, regarding complex formation constants of the cobalt and nickel ions that may configure a complex with ammonia, the complex formation constants of the two materials are substantially different from each other, and in detail, the constant shows the value of $5\times10^4$ in the case of $Co(NH_3)_6^{2+}$ that is a complex of the cobalt ions, and the constant shows the value of $2\times10^8$ in the case of $Ni(NH_3)_6^{2+}$ that is a complex of the nickel ions, so the complex of the nickel ions exists in a more stable way.

For the above-noted reason, $Ni(NH_3)_6^{2+}$ undergoes precipitation in a higher pH range than $Co(NH_3)_6^{2+}$, and the complex of the nickel ions frequently remains in a supernatant after a reaction in the case of co-precipitation driving.

Therefore, when the solubility of the metal ammonia complex compound is reversely estimated based on the above-noted precipitation phenomenon, the nickel complex compound ions ($Ni(NH_3)_6^{2+}$) may be considered to have the highest solubility, and the cobalt complex compound ions ($Co(NH_3)_6^{2+}$) may then be determined to have high solubility in a same driving condition of the process for manufacturing a ternary positive electrode precursor.

The manganese ions may not form a complex, so the solubility may be relatively very much lower than the nickel and cobalt ions. That is, in the same processing conditions such as concentration and pH by which the ternary positive electrode precursor is manufactured, an agitation speed, and a temperature, the solubility of the metal ions in the reactor may be considered to be increased as the composition of nickel in a precursor inflow solution increases, and the solubility of the metal ions may be considered to be reduced as the composition of manganese increases.

The major idea of the present invention is to analyze the conventional art according to understanding on the above-described concept and suggest a method for and realizing new orientation.

The conventional orientation realizing method is to realize the concentration gradient of the precursor, and the core solution used in an initial stage has a high nickel concentration, while the solution using a shell solution includes a large amount of manganese ions, so it is found that the solubility of the metal ions is low. That is, regarding the conventional method for realizing a precursor with orientation, the solubility of metal ions is very high in a center of the precursor, and the solubility of metal ions is gradually lowered toward the outside thereof.

The conventional art also uses a batch reactor, so the concentration of ions in the initial solution existing in the reactor is gradually lowered as the reaction progresses, and as a result, the conventional orientation realizing method may be deemed to be a driving method for maintaining the concentration of metal ions in the solution at less than a supersaturated state from start to end and preventing steep precipitation or crystal nuclei from being generated in a middle of the reaction.

To summarize such points and make a determination, the orientation realizing mechanism according to prior art may be analyzed, by the concept of the present invention, to be a method for manufacturing a precursor using a self-assembly phenomenon to the maximum by growing crystal while suppressing precipitation and nucleation in a maximum way.

Therefore, the present invention proposes a method for realizing orientation in a flow reactor based on the above-noted mechanism.

The present invention confirms that it is possible to manufacture a positive electrode material with orientation according to a process variable by using the conventional precursor manufacturing mechanism. That is, when co-precipitation driving is progressed in the condition of suppressing nucleation by controlling the process variable, orientation may be imparted in the situation of no concentration gradient in the influent according to a driving time.

The process variables in the precursor co-precipitation process include a reactor agitation speed, an inflow amount of ammonia against metal ions, a value of pH in the reactor, a temperature inside the reactor, and a reactor residence time.

An increase of the agitation speed is determined to impart orientation. In detail, it is found that, when the agitation speed of the reactor is a linear velocity that is equal to or greater than 3 m/s and equal to or less than 15 m/s, the precursor with orientation is acquired. The agitation speed with the above-noted velocity may be generally realized to be in a range that is equal to or greater than 80 rpm in a 1 cubic meter-level Taylor reactor.

It is found that orientation is shown as a use of ammonia that is a complexing agent input to a metal ion material increases. In the present invention, the precursor with orientation is obtained when the input flow of ammonia against metal ions is 1:0.95 to 1:1.5 as a molar ratio. In detail, the precursor with the best orientation may be obtained when it is 1:1.1 to 1:1.2.

As the temperature of the reactor lowers, the nucleation is suppressed and orientation is then obtained. The orientation may be obtained at 25 to 55° C., and the precursor with the best orientation is obtainable at 30 to 45° C.

It is the most advantageous to minimize a reactor residence time. Regarding the present reactor, the precursor with orientation is obtained when the residence time is 30 min to 4 h, and in detail, the best orientation is obtained when it is 30 min to 1 h.

Based upon such the idea, the orientation is realized by changing the agitation speed of the reactor, the ratio of ammonia, the reaction temperature, and the residence time. The above-noted orientation realizing method is applicable to a Taylor reactor and a batch reactor for manufacturing a positive electrode precursor as well as the continuous tank reactor.

Desired exemplary embodiments of the present invention, a comparative example compared thereto, and estimated examples thereof will now be described. However, the exemplary embodiments to be described below are examples of the present invention, and the present invention is not limited thereto.

EXPERIMENTAL EXAMPLE

Manufacturing a Positive Active Material

A positive electrode precursor is manufactured by applying a 50 liter Couette-Taylor flow reactor.

Regarding the initial condition in the reactor, pH is adjusted to be 10.7 by using a solution that is a mixture of 25 wt % caustic soda and 28 wt % ammonia at a weight percent of 85:15. NaOH is then added according to a reactor driving pH. To inject a reactant, a metal sulfate solution of a 2.5M concentration mixed with a nickel sulfate, a cobalt sulfate, and a manganese sulfate at a molar ratio of 88:9.5:2.5 is continuously added.

The temperature inside the reactor is changed according to respective conditions as expressed in the tables below, and driving is performed while maintaining the temperature. The mole flow (mol/min) of ammonia against the mole flow (mol/min) of the metal sulfate solution is also changed according to the reference given in the tables. Co-precipitation is performed by adjusting pH to be in a targeted range by use of NaOH.

Tests other than the change of agitation speed have a set condition of driving a Taylor reactor with the linear velocity of 11.0 m/s and a residence time of 1 h. The manufactured co-precipitation precursor is obtained, an ICP analysis is performed, and a calcination process is performed for 15 h at 750° C. with the molar ratio of LiOH with the composition of 1.03 against metal to thus obtain a final positive electrode material.

Electrochemical Characteristic Estimating Method

An electrochemical estimation is performed by using a CR2032-type coin cell. A slurry for manufacturing an electrode plate has the ratio of positive electrode:conductive material (Denka black):binder (PVDF, KF1100)=96.5:2.0:1.5 wt %, and viscosity of the slurry is adjusted by adding NMP (N-methyl-2-pyrrolidone) so that a solid amount may be about 30%.

The manufactured slurry is coated on a foil of Al that is 15 μm thick by using a doctor blade, and is then dry rolled. An electrode loading amount is 14.6 mg/cm$^2$, and rolling density is 3.1 g/cm$^3$.

The electrolyte solution generated by adding 1.5% of VC to a 1M LiPF6 in EC:DMC:EMC=3:4:3 (vol %) is used, a coin cell is manufactured by using a PP separation film and a lithium cathode (200 μm, Honzo metal), an aging process is performed at room temperature for 10 h, and a charging and discharging test is performed.

Capacity estimation is performed with 200 mAh/g as a reference capacity, and an applied charging and discharging condition includes a CC/CV of 2.5 to 4.25 V and a cut-off of ½₀C.

Initial capacity performs a 0.2 C charging/0.2 C discharging after a 0.1 C charging/0.1 C discharging.

An output characteristic is obtained by measuring discharging capacity while increasing a C-rate at 0.1 C/0.2 C/0.5 C/1 C/1.3 C/1.5 C/2 C, and a high-temperature cycle lifespan characteristic is measured thirty times at a high temperature of 45° C. in the 0.3 C charging/0.3 C discharging condition.

Orientation Analysis Method

To analyze orientation of positive electrode material powder particles, several tens to several hundreds of positive electrode material powder particles are fixed to a polymer resin and a mounting process is performed. After the mounting process is progressed, a polishing process is performed to a dried sample for a first time by using sandpaper, and the sample is transferred to an ion milling device so that a secondary surface process is performed thereto. When a cross-sectional image of the powder is observed to find that a hemispherical positive electrode material (a circular cross-section) is acquired after the ion milling process is finished, an operation for processing the cross-section of the positive electrode material is finished. The sample of which the cross-section is processed is moved to Electron Back Scatter Diffraction (EBSD) equipment and its orientation is analyzed. The orientation in directions of [001], [120], and [210] is analyzed with reference to a misorientation angle of +/−30 degrees. A reference structure uses a hexagonal structure, and a pole figure is acquired with respect to an ND axis and an RD axis.

Estimation Example 1: Manipulating Variables of [a Total Number of Moles of Metal Ions in a Metal Salt Aqueous Solution: A Number of Moles of Ammonia], and Controlling Other Variables within a Range of a Comparative Example As expressed in Table 1 to Table 4, one variable is given, and other variables are controlled. The results are given in Table 1 below.

As can be known from Table 1 to Table 4, a property of the positive electrode material is excellent in the range of 1:0.95 to 1:1.5. Further preferably, it is excellent in the range of 1:1.1 to 1:1.2.

TABLE 1

| No. | Manipulating variables Molar ratio of metal ions:ammonia | EBSD analysis result with less than 30 degrees of misorientation angle (Δg) | | | Direction of [120] + [210] with respect to ND axis | Sphericity l/w (Long axis diameter/short axis diameter of cross-section) | Density (g/cc) | |
|---|---|---|---|---|---|---|---|---|
| | | Direction of [001] with respect to ND axis | Direction of [210] with respect to ND axis | Direction of [120] with respect to ND axis | | | 25° C. Tap density | 25° C., 20 kN Roll density |
| A01 | 1:0.65 | 15 | 40 | 45 | 85 | 1.81 | 1.3 | 1.8 |
| A02 | 1:0.75 | 18 | 41 | 41 | 82 | 1.72 | 1.6 | 2.2 |
| A03 | 1:0.85 | 19 | 37 | 44 | 81 | 1.51 | 1.8 | 2.5 |
| A04 | 1:0.95 | 22 | 37 | 41 | 78 | 1.46 | 2.2 | 3.0 |
| A05 | 1:1.00 | 24 | 37 | 39 | 76 | 1.23 | 2.3 | 3.1 |
| A06 | 1:1.10 | 29 | 35 | 36 | 71 | 1.13 | 2.5 | 3.4 |
| A07 | 1:1.15 | 32 | 34 | 34 | 68 | 1.13 | 2.6 | 3.5 |
| A08 | 1:1.20 | 34 | 31 | 35 | 66 | 1.02 | 2.5 | 3.4 |
| A09 | 1:1.25 | 34 | 32 | 35 | 67 | 1.02 | 2.1 | 2.9 |
| A10 | 1:1.35 | 34 | 33 | 34 | 67 | 1.03 | 2.0 | 2.7 |
| A11 | 1:1.45 | 33 | 32 | 35 | 67 | 1.04 | 1.8 | 2.5 |
| A12 | 1:1.5 | 34 | 31 | 36 | 67 | 1.03 | 1.7 | 2.3 |
| A13 | 1:1.55 | 33 | 33 | 34 | 67 | 1.06 | 1.6 | 2.3 |
| A14 | 1:1.65 | 32 | 33 | 35 | 68 | 1.09 | 1.6 | 2.3 |
| A15 | 1:1.75 | 30 | 34 | 36 | 70 | 1.0 | 1.6 | 2.2 |

TABLE 2

| No. | Manipulating variables Molar ratio of metal ions:ammonia | EBSD analysis result with misorientation angle (Δg) of less than 30 degrees | | | | Sphericity l/w | Density (g/cc) | |
|---|---|---|---|---|---|---|---|---|
| | | Direction of [001] with respect to RD axis | Direction of [210] with respect to RD axis | Direction of [120] with respect to RD axis | Direction of [120] + [210] with respect to RD axis | | 25° C. Tap density | 25° C., 20 kN Roll density |
| A01 | 1:0.65 | 63 | 20 | 18 | 38 | 1.81 | 1.3 | 1.8 |
| A02 | 1:0.75 | 49 | 24 | 27 | 51 | 1.72 | 1.6 | 2.2 |
| A03 | 1:0.85 | 38 | 27 | 35 | 62 | 1.51 | 1.8 | 2.5 |
| A04 | 1:0.95 | 29 | 28 | 43 | 71 | 1.46 | 2.2 | 3.0 |
| A05 | 1:1.00 | 25 | 29 | 46 | 75 | 1.23 | 2.3 | 3.1 |
| A06 | 1:1.10 | 18 | 32 | 50 | 82 | 1.13 | 2.5 | 3.4 |
| A07 | 1:1.15 | 15 | 33 | 52 | 85 | 1.13 | 2.6 | 3.5 |
| A08 | 1:1.20 | 13 | 35 | 52 | 87 | 1.02 | 2.5 | 3.4 |
| A09 | 1:1.25 | 14 | 34 | 52 | 86 | 1.02 | 2.1 | 2.9 |
| A10 | 1:1.35 | 15 | 35 | 50 | 85 | 1.03 | 2.0 | 2.7 |
| A11 | 1:1.45 | 14 | 37 | 49 | 86 | 1.04 | 1.8 | 2.5 |
| A12 | 1:1.5 | 14 | 38 | 47 | 86 | 1.03 | 1.7 | 2.3 |
| A13 | 1:1.55 | 14 | 34 | 52 | 86 | 1.06 | 1.6 | 2.3 |
| A14 | 1:1.65 | 13 | 33 | 54 | 87 | 1.09 | 1.6 | 2.3 |
| A15 | 1:1.75 | 15 | 32 | 53 | 85 | 1.03 | 1.6 | 2.2 |

TABLE 3

| No. | Manipulating variables Molar ratio of metal ions:ammonia | D10 | D25 | D50 | D75 | D90 |
|---|---|---|---|---|---|---|
| A01 | 1:0.65 | 8.9 | 10.0 | 11.7 | 13.8 | 16.3 |
| A02 | 1:0.75 | 8.4 | 9.4 | 11.0 | 13.0 | 15.3 |
| A03 | 1:0.85 | 7.7 | 8.7 | 10.2 | 12.0 | 14.1 |
| A04 | 1:0.95 | 12.6 | 14.1 | 16.5 | 19.5 | 23.0 |
| A05 | 1:1.00 | 12.5 | 14.1 | 16.4 | 19.4 | 22.9 |
| A06 | 1:1.10 | 12.8 | 14.4 | 16.8 | 19.8 | 23.3 |
| A07 | 1:1.15 | 12.7 | 14.3 | 16.7 | 19.7 | 23.2 |
| A08 | 1:1.20 | 12.9 | 14.5 | 17.0 | 20.0 | 23.6 |
| A09 | 1:1.25 | 12.7 | 14.2 | 16.6 | 19.6 | 23.1 |
| A10 | 1:1.35 | 12.4 | 13.9 | 16.3 | 19.2 | 22.6 |
| A11 | 1:1.45 | 12.1 | 13.6 | 16.1 | 8.8 | 22.2 |
| A12 | 1:1.5 | 11.9 | 13.3 | 16.0 | 18.4 | 21.7 |
| A13 | 1:1.55 | 9.7 | 10.9 | 12.7 | 15.0 | 17.7 |
| A14 | 1:1.65 | 9.4 | 10.6 | 12.4 | 14.6 | 17.2 |
| A15 | 1:1.75 | 9.0 | 10.1 | 11.9 | 14.0 | 16.5 |

TABLE 4

| No. | Initial discharging capacity @0.2 C | Initial efficiency | 30 cycle discharging capacity | Capacity maintaining rate (%) after 30 cycles | 100 cycle discharging capacity | Capacity maintaining rate (%) after 100 cycles | Capacity maintaining rate (%) after 100 cycles (45° C) |
|---|---|---|---|---|---|---|---|
| | Characteristics of 25 OR 30° C. | | | | | | Characteristics of 45° C. |
| A01 | 192.3 | 84.0 | 175.4 | 85 | 149.1 | 78 | 37 |
| A02 | 198.8 | 86.8 | 188.2 | 89 | 167.4 | 85 | 45 |
| A03 | 201.0 | 87.8 | 189.6 | 91 | 172.5 | 92 | 80 |
| A04 | 205.4 | 89.7 | 196.5 | 97 | 190.6 | 95 | 85 |
| A05 | 206.7 | 90.3 | 196.7 | 97 | 190.8 | 95 | 86 |
| A06 | 207.6 | 90.7 | 196.5 | 98 | 192.5 | 95 | 86 |
| A07 | 208.2 | 90.8 | 197.1 | 98 | 193.1 | 96 | 86 |
| A08 | 208.7 | 91.2 | 197.7 | 98 | 193.7 | 96 | 85 |
| A09 | 209.3 | 91.0 | 196.5 | 98 | 192.6 | 96 | 86 |
| A10 | 210.2 | 91.1 | 196.7 | 98 | 192.8 | 96 | 86 |
| A11 | 211.3 | 91.8 | 196.4 | 97 | 190.5 | 95 | 85 |
| A12 | 211.2 | 91.4 | 195.8 | 97 | 190.0 | 95 | 85 |
| A13 | 211.4 | 90.6 | 193.1 | 95 | 167.9 | 87 | 76 |
| A14 | 210.7 | 89.7 | 189.7 | 90 | 153.6 | 81 | 65 |
| A15 | 210.8 | 88.0 | 180.1 | 88 | 117.1 | 65 | 37 |

Estimation Example 2: Manipulating Reaction pH Variable, and Controlling Other Variables within a Range of Comparative Example As expressed in Table 5 to Table 8, one variable is given, and other variables are controlled. The results are expressed in Table 5 to Table 8.

As can be known from Table 5 to Table 8, the pH range of 10.5 to 12 is found to be excellent.

TABLE 5

| No. | Manipulating variables Processing pH | Direction of [001] with respect to ND axis | Direction of [210] with respect to ND axis | Direction of [120] with respect to ND axis | Direction of [120] + [210] with respect to ND axis | Sphericity l/w (Long axis diameter/short axis diameter of cross-section) | 25° C. Tap density | 25° C., 20 kN roll density |
|---|---|---|---|---|---|---|---|---|
| | | EBSD analysis result with misorientation angle (Δg) of less than 30 degrees | | | | | Density (g/cc) | |
| B01 | 9.0 | 32 | 33 | 35 | 68 | 1.12 | 1.66 | 2.3 |
| B02 | 9.5 | 33 | 33 | 34 | 67 | 1.13 | 1.76 | 2.3 |
| B03 | 10.0 | 34 | 31 | 36 | 67 | 1.12 | 1.87 | 2.4 |
| B04 | 10.5 | 33 | 32 | 35 | 67 | 1.09 | 2.0 | 3.0 |
| B05 | 11.0 | 34 | 31 | 35 | 66 | 1.08 | 2.5 | 3.4 |
| B06 | 11.5 | 29 | 35 | 36 | 71 | 1.17 | 2.5 | 3.4 |
| B07 | 12.0 | 22 | 37 | 41 | 74 | 1.36 | 2.3 | 3.1 |
| B08 | 12.5 | 18 | 41 | 41 | 82 | 1.73 | 1.6 | 2.2 |

TABLE 6

| No. | Manipulating variables Processing pH | Direction of [001] with respect to RD axis | Direction of [210] with respect to RD axis | Direction of [120] with respect to RD axis | Direction of [120] + [210] with respect to RD axis | Sphericity l/w | 25° C. Tap density | 25° C., 20 kN Roll density |
|---|---|---|---|---|---|---|---|---|
| | | EBSD analysis result with misorientation angle (Δg) of less than 30 degrees | | | | | Density (g/cc) | |
| B01 | 9.0 | 15 | 32 | 53 | 85 | 1.12 | 1.66 | 2.3 |
| B02 | 9.5 | 15 | 38 | 47 | 85 | 1.13 | 1.76 | 2.3 |

TABLE 6-continued

| | | EBSD analysis result with misorientation angle (Δg) of less than 30 degrees | | | Direction of | | Density | |
| | | Direction of | Direction of | Direction of | [120] + | | (g/cc) | |
| No. | Manipulating variables Processing pH | [001] with respect to RD axis | [210] with respect to RD axis | [120] with respect to RD axis | [210] with respect to RD axis | Sphericity l/w | 25° C. Tap density | 25° C., 20 kN Roll density |
|---|---|---|---|---|---|---|---|---|
| B03 | 10.0 | 14 | 34 | 52 | 87 | 1.12 | 1.87 | 2.4 |
| B04 | 10.5 | 14 | 34 | 52 | 86 | 1.09 | 2.0 | 3.0 |
| B05 | 11.0 | 13 | 35 | 52 | 87 | 1.08 | 2.5 | 3.4 |
| B06 | 11.5 | 18 | 32 | 50 | 82 | 1.17 | 2.5 | 3.4 |
| B07 | 12.0 | 22 | 31 | 47 | 78 | 1.36 | 2.3 | 3.1 |
| B08 | 12.5 | 49 | 24 | 27 | 51 | 1.73 | 1.6 | 2.2 |

TABLE 7

| No. | Manipulating variables Processing pH | D10 | D25 | D50 | D75 | D90 |
|---|---|---|---|---|---|---|
| B01 | 9.0 | 9.1 | 10.2 | 11.9 | 14.1 | 16.6 |
| B02 | 9.5 | 12.0 | 13.4 | 15.7 | 18.5 | 21.8 |
| B03 | 10.0 | 12.5 | 14.0 | 16.4 | 19.3 | 22.7 |
| B04 | 10.5 | 12.8 | 14.3 | 16.7 | 19.7 | 23.2 |
| B05 | 11.0 | 13.0 | 14.6 | 17.1 | 20.1 | 23.7 |
| B06 | 11.5 | 12.6 | 14.2 | 16.5 | 19.5 | 23.0 |
| B07 | 12.0 | 12.7 | 14.2 | 16.6 | 19.6 | 23.1 |
| B08 | 12.5 | 8.5 | 9.5 | 11.1 | 13.1 | 15.4 |

TABLE 8

| | Characteristics of 25 OR 30° C. | | | | | | Characteristics of 45° C. |
| No. | Initial discharging capacity @0.2 C | Initial efficiency | 30 cycle discharging capacity | Capacity maintaining rate (%) after 30 cycles | 100 cycle discharging capacity | Capacity maintaining rate (%) after 100 cycles | Capacity maintaining rate (%) after 100 cycles |
|---|---|---|---|---|---|---|---|
| B01 | 192.3 | 84.0 | 175.4 | 85 | 149.2 | 78 | 44 |
| B02 | 198.8 | 86.8 | 188.2 | 89 | 167.5 | 85 | 65 |
| B03 | 201.0 | 87.8 | 189.6 | 91 | 172.6 | 92 | 76 |
| B04 | 205.4 | 89.7 | 196.5 | 97 | 190.6 | 95 | 83 |
| B05 | 206.7 | 90.3 | 196.7 | 97 | 190.8 | 95 | 84 |
| B06 | 208.7 | 90.8 | 196.5 | 97 | 192.6 | 96 | 85 |
| B07 | 208.2 | 91.2 | 197.1 | 98 | 193.2 | 96 | 85 |
| B08 | 209.3 | 92.1 | 181.0 | 88 | 117.0 | 65 | 37 |

Estimation Example 3: Manipulating Residence Time Variable of Metal Salt Solution, and Controlling Other Variables within the Range of Comparative Example As expressed in Table 9 to Table 12, one variable is given, and other variables are controlled. The results are expressed in Table 9 to Table 12.

As can be found from Table 9 to Table 12, the residence time in the range of 30 minutes to 4 hours is found to be excellent.

TABLE 9

| No. | Manipulating variables Residence time | EBSD analysis result with misorientation angle (Δg) of less than 30 degrees | | | Direction of [120] + [210] with respect to ND axis | Sphericity l/w (Long axis diameter/short axisdiameter of cross-section) | Density (g/cc) | |
|---|---|---|---|---|---|---|---|---|
| | | Direction of [001] with respect to ND axis | Direction of [210] with respect to ND axis | Direction of [120] with respect to ND axis | | | 25° C. Tap density | 25° C. 20 kN Roll density |
| C01 | 15 min | 32 | 34 | 35 | 68 | 1.31 | 1.3 | 2.3 |
| C02 | 30 min | 33 | 33 | 34 | 67 | 1.02 | 1.7 | 2.3 |
| C03 | 1 h | 34 | 31 | 36 | 67 | 1.01 | 1.8 | 2.5 |
| C04 | 2 h | 34 | 31 | 35 | 66 | 1.01 | 2.4 | 3.5 |
| C05 | 3 h | 29 | 35 | 36 | 71 | 1.09 | 2.2 | 3.4 |
| C06 | 4 h | 19 | 37 | 44 | 71 | 1.21 | 2.4 | 3.4 |
| C07 | 6 h | 18 | 41 | 41 | 82 | 1.22 | 2.5 | 3.4 |
| C08 | 8 h | 19 | 40 | 41 | 81 | 1.27 | 2.5 | 3.5 |

TABLE 10

| No. | Manipulating variables Residence time | EBSD analysis result with misorientation angle (Δg) of less than 30 degrees | | | RD axis respect [120] + [210] direction | Sphericity l/w | Density (g/cc) | |
|---|---|---|---|---|---|---|---|---|
| | | RD axis respect [001] direction | RD axis respect [210] direction | RD axis respect [120] direction | | | 25° C. Tap density | 25° C., 20 kN Roll density |
| C01 | 15 min | 15 | 32 | 53 | 85 | 1.31 | 1.3 | 2.3 |
| C02 | 30 min | 14 | 34 | 52 | 86 | 1.02 | 1.7 | 2.3 |
| C03 | 1 h | 15 | 38 | 47 | 85 | 1.01 | 1.8 | 2.5 |
| C04 | 2 h | 14 | 34 | 52 | 86 | 1.01 | 2.4 | 3.5 |
| C05 | 3 h | 25 | 29 | 46 | 75 | 1.09 | 2.2 | 3.4 |
| C06 | 4 h | 38 | 27 | 35 | 62 | 1.21 | 2.4 | 3.4 |
| C07 | 6 h | 49 | 24 | 27 | 51 | 1.22 | 2.5 | 3.4 |
| C08 | 8 h | 50 | 20 | 30 | 50 | 1.27 | 2.5 | 3.5 |

TABLE 11

| No. | Manipulating variables Residence time | D10 | D25 | D50 | D75 | D90 |
|---|---|---|---|---|---|---|
| C01 | 15 min | 9.1 | 10.0 | 11.8 | 13.9 | 16.4 |
| C02 | 30 min | 9.7 | 10.8 | 12.6 | 14.9 | 17.6 |
| C03 | 1 h | 12.1 | 13.5 | 15.8 | 18.7 | 22.1 |
| C04 | 2 h | 12.8 | 14.4 | 16.9 | 19.9 | 23.5 |
| C05 | 3 h | 15.4 | 17.3 | 20.3 | 23.9 | 28.2 |
| C06 | 4 h | 14.8 | 16.6 | 19.4 | 22.9 | 27.0 |
| C07 | 6 h | 14.1 | 15.9 | 18.6 | 21.9 | 25.8 |
| C08 | 8 h | 13.5 | 15.1 | 17.7 | 20.9 | 24.7 |

TABLE 12

| No. | Residence time | Characteristics of 25 OR 30° C. | | | | Characteristics of 45° C. | |
|---|---|---|---|---|---|---|---|
| | | Initial efficiency | 30 cycle discharging capacity | Capacity maintaining rate (%) after 30 cycles | 100 cycle discharging capacity | Capacity maintaining rate (%) after 100 cycles | Capacity maintaining rate (%) after 100 cycles |
| C01 | 15 min | 91.4 | 189.7 | 88 | 117.0 | 65 | 37 |
| C02 | 30 min | 91.8 | 196.4 | 97 | 188.4 | 95 | 86 |
| C03 | 1 h | 91.0 | 196.5 | 98 | 188.5 | 96 | 86 |
| C04 | 2 h | 91.2 | 197.7 | 98 | 193.6 | 96 | 85 |
| C05 | 3 h | 89.7 | 196.7 | 97 | 190.8 | 95 | 83 |
| C06 | 4 h | 87.8 | 189.6 | 91 | 172.4 | 92 | 76 |

TABLE 12-continued

| | Characteristics of 25 OR 30° C. | | | | | Characteristics of 45° C. | |
|---|---|---|---|---|---|---|---|
| No. | Residence time | Initial efficiency | 30 cycle discharging capacity | Capacity maintaining rate (%) after 30 cycles | 100 cycle discharging capacity | Capacity maintaining rate (%) after 100 cycles | Capacity maintaining rate (%) after 100 cycles |
| C07 | 6 h | 86.8 | 188.2 | 89 | 167.3 | 85 | 65 |
| C08 | 8 h | 84.0 | 175.4 | 85 | 149.0 | 78 | 44 |

Estimation Example 4: Manipulating Agitation Speed Variable, and Controlling Other Variables within the Range of Comparative Example As expressed in Table 13 to Table 16, one variable is given, and other variables are controlled. The results are expressed in Table 13 to Table 16.

As can be known from Table 13 to Table 16, the agitation speed in the range of 80 to 200 rpm is found to be excellent.

TABLE 13

| | | EBSD analysis result with misorientation angle (Δg) of less than 30 degrees | | | Direction of | Sphericity | Density | |
|---|---|---|---|---|---|---|---|---|
| | | Direction of | Direction of | Direction of | [120] + | l/w | (g/cc) | |
| No. | Manipulating variables Agitation speed | [001] with respect to ND axis | [210] with respect to ND axis | [120] with respect to ND axis | [210] with respect to ND axis | (Long axis diameter/short axis diameter of cross-section) | 25° C. Tap density | 25° C., 20 kN Roll density |
| D01 | 30 | 15 | 40 | 45 | 85 | 1.83 | 1.6 | 2.1 |
| D02 | 50 | 18 | 41 | 41 | 82 | 1.52 | 1.8 | 2.4 |
| D03 | 80 | 29 | 35 | 36 | 71 | 1.12 | 2.5 | 3.4 |
| D04 | 100 | 34 | 31 | 35 | 66 | 1.07 | 2.5 | 3.4 |
| D05 | 200 | 34 | 32 | 35 | 67 | 1.07 | 2.6 | 3.4 |
| D06 | 300 | 18 | 41 | 41 | 82 | 1.09 | 2.3 | 3.3 |

TABLE 14

| | | EBSD analysis result with misorientation angle (Δg) of less than 30 degrees | | | | | Density | |
|---|---|---|---|---|---|---|---|---|
| | | Direction of | Direction of | Direction of | Direction of | | (g/cc) | |
| No. | Manipulating variables Agitation speed | [001] with respect to RD axis | [210] with respect to RD axis | [120] with respect to RD axis | [120] + [210] with respect to RD axis | Sphericity l/w | 25° C. Tap density | 25° C., 20 kN Roll density |
| D01 | 30 | 63 | 20 | 18 | 38 | 1.83 | 1.6 | 2.1 |
| D02 | 50 | 49 | 24 | 27 | 51 | 1.52 | 1.8 | 2.4 |
| D03 | 80 | 23 | 31 | 46 | 77 | 1.12 | 2.5 | 3.4 |
| D04 | 100 | 18 | 32 | 50 | 82 | 1.07 | 2.5 | 3.4 |
| D05 | 200 | 15 | 38 | 47 | 85 | 1.07 | 2.6 | 3.4 |
| D06 | 300 | 38 | 27 | 35 | 62 | 1.09 | 2.3 | 3.3 |

TABLE 15

| No. | Manipulating variables Processing pH | D10 | D25 | D50 | D75 | D90 |
|---|---|---|---|---|---|---|
| D01 | 30 | 8.6 | 10.2 | 11.9 | 14.0 | 16.5 |
| D02 | 50 | 7.8 | 8.9 | 10.4 | 12.2 | 14.3 |
| D03 | 80 | 13.0 | 14.6 | 17.0 | 20.0 | 23.5 |
| D04 | 100 | 12.9 | 14.5 | 16.9 | 19.9 | 23.5 |
| D05 | 200 | 13.1 | 14.7 | 17.2 | 20.2 | 23.8 |
| D06 | 300 | 9.2 | 10.3 | 12.1 | 14.2 | 16.7 |

TABLE 16

| | Characteristics of 25 OR 30° C. | | | | | | Characteristics of 45° C. |
|---|---|---|---|---|---|---|---|
| No. | Initial discharging capacity @0.2 C | Initial efficiency | 30 cycle discharging capacity | Capacity maintaining rate (%) after 30 cycles | 100 cycle discharging capacity | Capacity maintaining rate (%) after 100 cycles | Capacity maintaining rate (%) after 100 cycles |
| D01 | 198.8 | 86.8 | 188.2 | 89 | 167.4 | 85 | 65 |
| D02 | 201.0 | 87.8 | 189.6 | 91 | 172.5 | 92 | 76 |
| D03 | 207.6 | 90.7 | 196.5 | 98 | 192.5 | 95 | 85 |
| D04 | 208.2 | 90.8 | 197.1 | 98 | 193.1 | 95 | 85 |
| D05 | 208.7 | 91.2 | 197.7 | 98 | 193.7 | 96 | 85 |
| D06 | 209.3 | 88.0 | 196.7 | 88 | 117.1 | 65 | 37 |

Estimation Example 5: Manipulating Reaction Temperature Variable, and Controlling Other Variables within the Range of Comparative Example As expressed in Table 17 to Table 20, one variable is given, and other variables are controlled. The results are expressed in Table 17 to Table 20.

As can be known from Table 17 to Table 20, the reaction temperature in the range of 30 to 50° C. (in detail, 30 to 45° C.) is found to be excellent.

TABLE 17

| | | EBSD analysis result with misorientation angle (Δg) of less than 30 degrees | | | Direction of | Sphericity | Density | |
|---|---|---|---|---|---|---|---|---|
| | | Direction of | Direction of | Direction of | | | (g/cc) | |
| No. | Manipulating variable Reaction temperature | [001] with respect to ND axis | [210] with respect to ND axis | [120] with respect to ND axis | [120] + [210] with respect to ND axis | (Long axis diameter/short axis diameter of cross-section) l/w | 25° C. Tap density | 25° C., 20 kN Roll density |
| E01 | 25 | 32 | 33 | 35 | 68 | 1.23 | 1.8 | 2.6 |
| E02 | 30 | 34 | 31 | 36 | 67 | 1.17 | 2.3 | 3.4 |
| E03 | 35 | 34 | 32 | 35 | 67 | 1.09 | 2.4 | 3.4 |
| E04 | 40 | 29 | 35 | 36 | 71 | 1.06 | 2.6 | 3.5 |
| E05 | 45 | 24 | 37 | 39 | 76 | 1.03 | 2.6 | 3.5 |
| E06 | 50 | 19 | 37 | 44 | 81 | 1.11 | 2.6 | 3.4 |
| E07 | 60 | 15 | 40 | 45 | 85 | 1.67 | 2.5 | 3.2 |

TABLE 18

| | | EBSD analysis result with misorientation angle (Δg) of less than 30 degrees | | | | | Density | |
|---|---|---|---|---|---|---|---|---|
| | | Direction of | Direction of | Direction of | Direction of | | (g/cc) | |
| No. | Manipulating variables Reaction temperature | [001] with respect to RD axis | [210] with respect to RD axis | [120] with respect to RD axis | [120] + [210] with respect to RD axis | Sphericity l/w | 25° C. Tap density | 25° C., 20 kN Roll density |
| E01 | 25 | 15 | 32 | 53 | 85 | 1.23 | 1.8 | 2.6 |
| E02 | 30 | 14 | 34 | 52 | 86 | 1.17 | 2.3 | 3.4 |
| E03 | 35 | 14 | 35 | 50 | 85 | 1.09 | 2.4 | 3.4 |
| E04 | 40 | 15 | 33 | 52 | 85 | 1.06 | 2.6 | 3.5 |
| E05 | 45 | 18 | 32 | 50 | 82 | 1.03 | 2.6 | 3.5 |
| E06 | 50 | 29 | 28 | 43 | 71 | 1.11 | 2.6 | 3.4 |
| E07 | 60 | 38 | 27 | 35 | 62 | 1.67 | 2.5 | 3.2 |

TABLE 19

| No. | Manipulating variables Reaction temperature | D10 | D25 | D50 | D75 | D90 |
|---|---|---|---|---|---|---|
| E01 | 25 | 3.7 | 4.2 | 5.1 | 6.0 | 7.0 |
| E02 | 30 | 5.0 | 5.7 | 6.8 | 8.1 | 9.5 |
| E03 | 35 | 7.6 | 8.6 | 10.2 | 11.9 | 14.1 |
| E04 | 40 | 12.5 | 14.0 | 16.4 | 19.4 | 23.0 |
| E05 | 45 | 12.7 | 14.3 | 16.7 | 19.7 | 23.2 |
| E06 | 50 | 12.6 | 14.2 | 16.6 | 19.6 | 23.3 |
| E07 | 60 | 6.3 | 7.1 | 8.5 | 10.0 | 11.8 |

TABLE 20

| | Characteristics of 25 OR 30° C. | | | | | Characteristics of 45° C. | |
|---|---|---|---|---|---|---|---|
| No. | Initial discharging capacity @0.2 C | Initial efficiency | 30 cycle discharging capacity | Capacity maintaining rate (%) after 30 cycles | 100 cycle discharging capacity | Capacity maintaining rate (%) after 100 cycles | Capacity maintaining rate (%) after 100 cycles |
| E01 | 211.3 | 91.8 | 196.4 | 97 | 149.1 | 78 | 77 |
| E02 | 211.2 | 91.2 | 195.8 | 97 | 186.0 | 95 | 85 |
| E03 | 209.3 | 91.0 | 196.5 | 98 | 188.6 | 96 | 86 |
| E04 | 210.2 | 89.7 | 196.5 | 97 | 190.6 | 95 | 84 |
| E05 | 209.7 | 91.0 | 196.6 | 98 | 188.7 | 96 | 86 |
| E06 | 206.7 | 87.3 | 189.6 | 91 | 179.6 | 89 | 81 |
| E07 | 195.4 | 85.7 | 181.7 | 86 | 167.5 | 81 | 69 |

Estimation Example 6: Final Product Manufacturing Tests (Comparative Example and Exemplary Embodiment)

An exemplary embodiment (EE) applies a process variable that is in an optimized area and a comparative example (CE) performs a test on a case that is outside the optimized area and showing no orientation.

TABLE 21

| No. | Molar ratio metal ions:ammonia | Reaction pH | Residence time (h) | Agitation speed (rpm) | Reaction temperature (° C.) |
|---|---|---|---|---|---|
| EE1 | 1:1.10 | 11.0 | 1.0 | 100 | 45 |
| EE2 | 1:1.2 | 11.0 | 1.0 | 100 | 45 |
| EE3 | 1:1.1 | 10.5 | 1.0 | 100 | 45 |
| EE4 | 1:1.1 | 11.0 | 0.5 | 100 | 45 |
| EE6 | 1:1.1 | 11.0 | 1.0 | 200 | 45 |
| EE7 | 1:1.1 | 11.0 | 1.0 | 100 | 35 |
| CE1 | 1:0.85 | 12.5 | 4.0 | 50 | 60 |

TABLE 22

| | | EBSD analysis result with misorientation angle ($\Delta g$) of less than 30 degrees | | | | Sphericity l/w | Density (g/cc) | |
|---|---|---|---|---|---|---|---|---|
| No. | Manipulating variables | Direction of [001] with respect to ND axis | Direction of [210] with respect to ND axis | Direction of [120] with respect to ND axis | Direction of [120] + [210] with respect to ND axis | (Long axis diameter/short axis diameter of cross-section) | 25° C. Tap density | 25° C., 20 kN roll density |
| EE1 | Orientation improving condition | 29 | 35 | 36 | 71 | 1.13 | 2.5 | 3.4 |

TABLE 22-continued

| | | EBSD analysis result with misorientation angle (Δg) of less than 30 degrees | | | | Sphericity l/w | Density (g/cc) | |
|---|---|---|---|---|---|---|---|---|
| | | Direction of [001] with respect to ND axis | Direction of [210] with respect to ND axis | Direction of [120] with respect to ND axis | Direction of [120] + [210] with respect to ND axis | (Long axis diameter/short axis diameter of cross-section) | 25° C. Tap density | 25° C., 20 kN roll density |
| No. | Manipulating variables | | | | | | | |
| EE2 | Ammonia increase | 34 | 32 | 35 | 67 | 1.03 | 2.4 | 3.2 |
| EE3 | pH reduction | 32 | 34 | 34 | 68 | 1.06 | 2.3 | 3.2 |
| EE4 | Residence time reduction | 33 | 33 | 34 | 67 | 1.02 | 2.1 | 3.2 |
| EE6 | Agitation speed increase | 34 | 31 | 35 | 66 | 1.07 | 2.4 | 3.5 |
| EE7 | Reaction temperature reduction | 34 | 32 | 35 | 67 | 1.17 | 2.1 | 3.1 |
| CE1 | Orientation suppressing condition | 15 | 40 | 45 | 85 | 1.67 | 1.3 | 2.3 |

TABLE 23

| | | EBSD analysis result with misorientation angle (Δg) of less than 30 degrees | | | | | Density (g/cc) | |
|---|---|---|---|---|---|---|---|---|
| | | Direction of [001] with respect to RD axis | Direction of [210] with respect to RD axis | Direction of [120] with respect to RD axis | Direction of [120] + [210] with respect to RD axis | Sphericity l/w | 25° C. Tap density | 25° C., 20 kN Roll density |
| No. | Manipulating variables | | | | | | | |
| EE1 | Orientation improving condition | 18 | 32 | 50 | 82 | 1.13 | 2.5 | 3.4 |
| EE2 | Ammonia increase | 14 | 34 | 52 | 86 | 1.03 | 2.4 | 3.2 |
| EE3 | pH reduction | 15 | 33 | 52 | 85 | 1.06 | 2.3 | 3.2 |
| EE4 | Residence time reduction | 14 | 37 | 49 | 86 | 1.02 | 2.1 | 3.2 |
| EE6 | Agitation speed increase | 13 | 35 | 52 | 87 | 1.07 | 2.4 | 3.5 |
| EE7 | Reaction temperature reduction | 14 | 37 | 49 | 86 | 1.17 | 2.1 | 3.1 |
| CE1 | Orientation suppressing condition | 63 | 20 | 18 | 38 | 1.67 | 1.3 | 2.3 |

TABLE 24

| | Characteristics of 25 OR 30° C. | | | | | | Characteristics of 45° C. |
|---|---|---|---|---|---|---|---|
| No. | Initial discharging capacity @0.2 C | Initial efficiency | 30 cycle discharging capacity | Capacity maintaining rate (%) after 30 cycles | 100 cycle discharging capacity | Capacity maintaining rate (%) after 100 cycles | Capacity maintaining rate (%) after 100 cycles |
| EE1 | 208.7 | 91.2 | 197.7 | 98 | 193.7 | 96 | 85 |
| EE2 | 209.3 | 91.0 | 196.5 | 98 | 192.6 | 96 | 86 |
| EE3 | 210.2 | 91.1 | 196.7 | 98 | 192.8 | 96 | 86 |
| EE4 | 211.4 | 90.6 | 193.1 | 95 | 179.8 | 93 | 84 |

TABLE 24-continued

|  | Characteristics of 25 OR 30° C. | | | | | | Characteristics of 45° C. |
| --- | --- | --- | --- | --- | --- | --- | --- |
| No. | Initial discharging capacity @0.2 C | Initial efficiency | 30 cycle discharging capacity | Capacity maintaining rate (%) after 30 cycles | 100 cycle discharging capacity | Capacity maintaining rate (%) after 100 cycles | Capacity maintaining rate (%) after 100 cycles |
| EE6 | 207.6 | 90.7 | 196.5 | 98 | 192.5 | 95 | 86 |
| EE7 | 213.6 | 92.8 | 198.3 | 98 | 194.5 | 97 | 89 |
| CE1 | 210.8 | 88.0 | 180.1 | 88 | 117.1 | 65 | 37 |

The present invention is not limited to the exemplary embodiments and may be produced in various forms, and it will be understood by those skilled in the art to which the present invention pertains that exemplary embodiments of the present invention may be implemented in other specific forms without modifying the technical spirit or essential features of the present invention. Therefore, it should be understood that the aforementioned exemplary embodiments are illustrative in terms of all aspects and are not limited.

What is claimed is:

1. A positive active material which is a lithium composite metal oxide including nickel, cobalt, and manganese, and has orientation in a direction of [001] with respect to an ND axis that is equal to or greater than 29% in the case of an EBSD (Electron Back Scatter Diffraction) analysis with a misorientation angle (Δg) that is equal to or less than 30 degrees.

2. The positive active material of claim 1, wherein the lithium composite metal oxide is manufactured according to a co-precipitation method in which a ratio of a total number of moles of metal ions in a metal salt aqueous solution to a number of moles of ammonia is controlled.

3. The positive active material of claim 1, wherein the lithium composite metal oxide is manufactured according to a co-precipitation method, and a pH range being controlled.

4. The positive active material of claim 1, wherein the lithium composite metal oxide is manufactured according to a co-precipitation method, and a residence time in a reactor of a metal aqueous solution is controlled.

5. The positive active material of claim 1, wherein the lithium composite metal oxide is manufactured according to a co-precipitation method, and an agitation speed in a co-precipitation reactor is controlled.

6. The positive active material of claim 1, wherein the lithium composite metal oxide is manufactured according to a co-precipitation method, and a reaction temperature in a co-precipitation reactor is controlled.

7. A lithium rechargeable battery comprising:
a positive electrode including a positive active material of claim 1;
a negative electrode; and
an electrolyte.

* * * * *